(12) United States Patent
Hu

(10) Patent No.: US 6,219,441 B1
(45) Date of Patent: Apr. 17, 2001

(54) RECONSTRUCTION OF IMAGES FROM THREE-DIMENSIONAL CONE BEAM DATA

(75) Inventor: Hui Hu, Waukesha, WI (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 08/081,040

(22) Filed: Jun. 22, 1993

(51) Int. Cl.$^7$ .................................................. G06T 1/00
(52) U.S. Cl. ................... 382/131; 378/4; 378/901
(58) Field of Search .................. 382/6, 131, 254, 382/275; 364/413.14, 413.15, 413.16, 413.17, 413.18, 413.19, 413.21; 378/4, 14, 15, 901

(56) References Cited

U.S. PATENT DOCUMENTS

| | | | |
|---|---|---|---|
| 4,352,020 | * 9/1982 | Horiba et al. | 378/18 |
| 4,740,896 | * 4/1988 | Horiba et al. | 378/4 |
| 5,170,439 | * 12/1992 | Zeng et al. | 382/131 |
| 5,253,171 | * 10/1993 | Hsiao et al. | 378/4 |
| 5,257,183 | * 10/1993 | Tam | 378/4 |
| 5,270,926 | * 12/1993 | Tam | 378/4 |
| 5,375,156 | * 12/1994 | Kuo-Petravic et al. | 378/9 |
| 5,396,528 | * 3/1995 | Hu et al. | 378/14 |

OTHER PUBLICATIONS

Herman. "Image Reconstruction from Projections: The Fundamentals of Computerized Tomography." Academic Press, pp. 108–117, 1980.*

Mathematical Framework of Cone Beam 3D Reconstruction Via the First Derivative of the Radon Transform, LETI/DSYS/SETLA/90–4433/PG, Nov. 1990, G. T. Herman, et al.

Practical Cone–Beam Algorithm, *J. Opt. Soc. Am.* A/vol. 1 No. 6/pp. 613–619/Jun. 1984, L. A. Feldkamp, et al.

* cited by examiner

*Primary Examiner*—Jon Chang
(74) *Attorney, Agent, or Firm*—Quarles & Brady, LLP; Christan G. Cabou

(57) ABSTRACT

A computed tomography x-ray imaging system acquires a three-dimensional array of x-ray attenuation values using a cone beam x-ray source and a curved two-dimensional array of detector elements. Two-dimensional image slices are reconstructed using a filtered back projection method, and corrections are made to the images to account for incomplete data due to the cone beam geometry.

9 Claims, 4 Drawing Sheets

RECONSTRUCTION OF IMAGES FROM THREE-DIMENSIONAL CONE BEAM DATA

BACKGROUND OF THE INVENTION

The present invention relates to computed tomography (CT) imaging apparatus; and more particularly, to reconstruction of images from three-dimensional data acquired with x-ray CT or SPECT scanners.

In a current computed tomography system, an x-ray source projects a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This process converts the attenuation measurements from a scan into integers called "CT numbers" or "Hounsfield units", which are used to control the brightness of a corresponding pixel on a cathode ray tube display.

In a 3D scan the x-ray beam diverges to form a cone beam that passes through the object and impinges on a two-dimensional array of detector elements. Each view is thus a 2D array of x-ray attenuation measurements and the complete scan produces a 3D array of attenuation measurements. Either of two methods are commonly used to reconstruct a set of images from the acquired 3D array of cone beam attenuation measurements. The first method described by L.A. Feldkamp et al in "Practical Cone-Beam Algorithm", *J. Opt. Soc. Am.*, A/Vol. 1, No. 6/June 1984 is a convolution backprojection method which operates directly on the line integrals of the actual attenuation measurements. The method can be implemented easily and accurately with current hardware and it is a good reconstruction for images at the center or "midplane", of the cone beam. The Feldkamp method employs the conventional convolution—back projection form, but this is an approximation that becomes less accurate at larger cone beam angles. The second method proposed by Pierre Grangeat in "Mathematical Framework of Cone Beam 3D Reconstruction Via the First Derivative of the Radon Transform", *Mathematical Methods In Tomography*, Herman, Louis, Natterer (eds.), Lecture notes in Mathematics, No. 1497, pp. 66–97, Spring Verlag, 1991, provides an accurate solution to the image reconstruction task based on a fundamental relationship between the derivative of the cone beam plane integral to the derivative of the parallel beam plane integral. While this method is theoretically accurate, it requires mathematical operations that can only be solved using finite numerical calculations that are approximations. The errors introduced by the implementation of the Grangeat method can be greater than Feldkamp and these errors are not correlated with cone beam angle.

SUMMARY OF THE INVENTION

The present invention relates to a computer tomography system which produces a three-dimensional array of data from which a set of 2D image slices can be reconstructed. More specifically, the system includes a 2D array of detector elements for receiving photons in a cone beam produced by a source while the two are rotated about a central axis to acquire data at a series of views, an image reconstructor which employs filtered back projection of the acquired cone beam data to produce image data; means for identifying data missing from the acquired cone beam data and estimating values for the missing cone beam data values; means for calculating correction image data from the estimated cone beam data values; and combining the correction image data with the back projection image data to produce an image slice.

A general object of the invention is to accurately reconstruct image slices from 3D cone beam data. A filtered back projection method is employed to accurately and efficiently produce the main part of the reconstruction. A second set of image data is also produced by estimating values not supported by the projection. Correction image data is produced from these estimated values and the resulting correction image is combined with the back projection image to produce the corrected image slice.

DETAILED DESCRIPTION OF THE INVENTION

Figure 1:
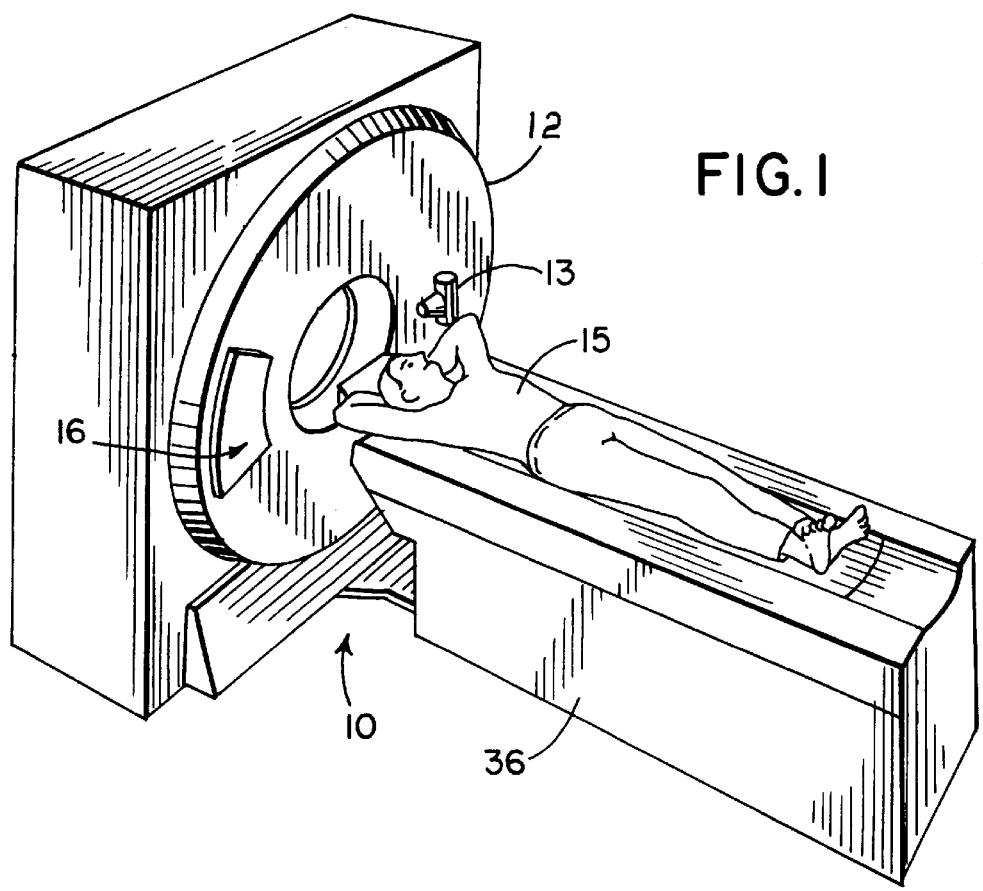
FIG. 1 is a pictorial view of a CT imaging system in which the present invention may be employed.
Figure 2:
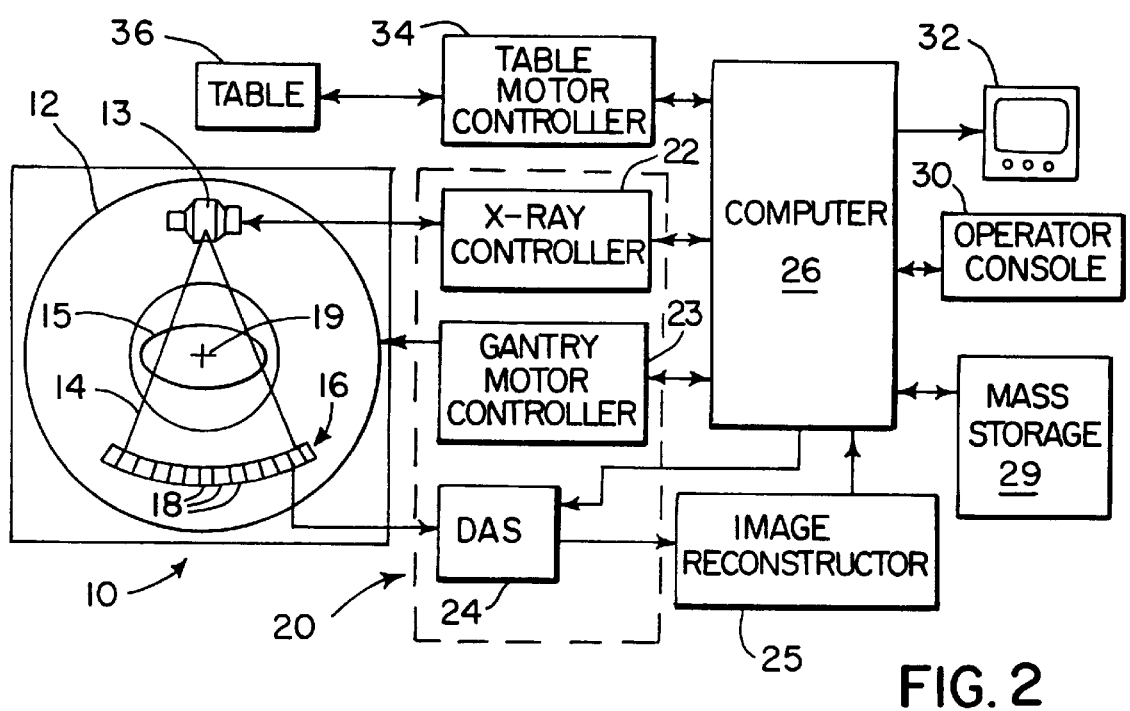
FIG. 2 is a block schematic diagram of the CT imaging system.

With initial reference to FIGS. 1 and 2, a computed tomography (CT) imaging system 10 includes a gantry 12 representative of a "third generation" CT scanner. Gantry 12 has an x-ray source 13 that projects a cone beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction according to the method of the present invention. The reconstructed image is applied as an input to a computer 26 which stores the image in a mass storage device 29.

The computer 26 also receives commands and scanning parameters from an operator via console 30 that has a keyboard. An associated cathode ray tube display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

Figure 3A:
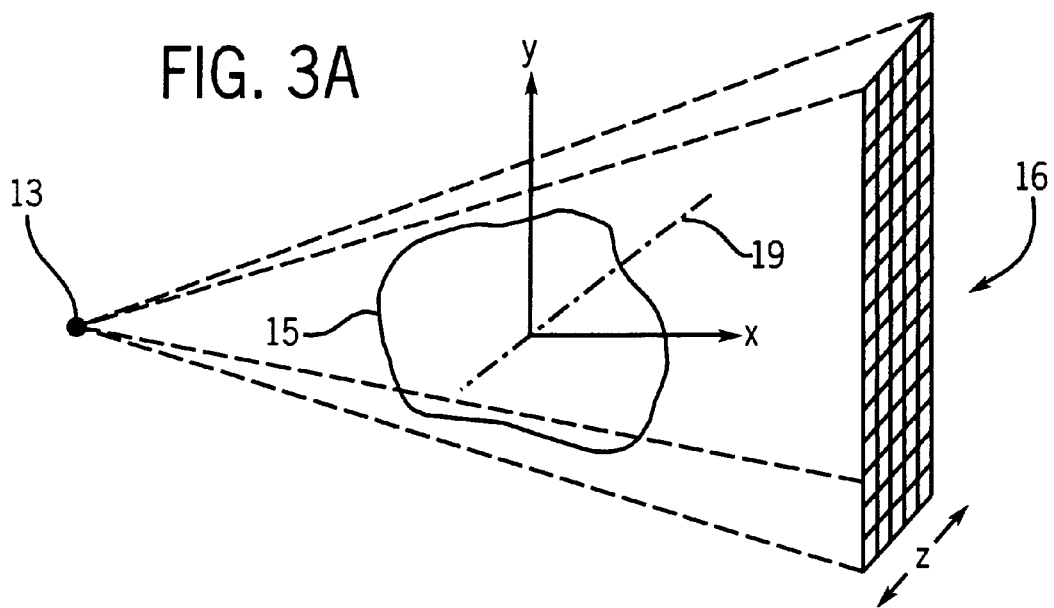
FIGS. 3a and 3b are pictorial views of the cone beam produced by the CT imaging system.
Figure 3B:
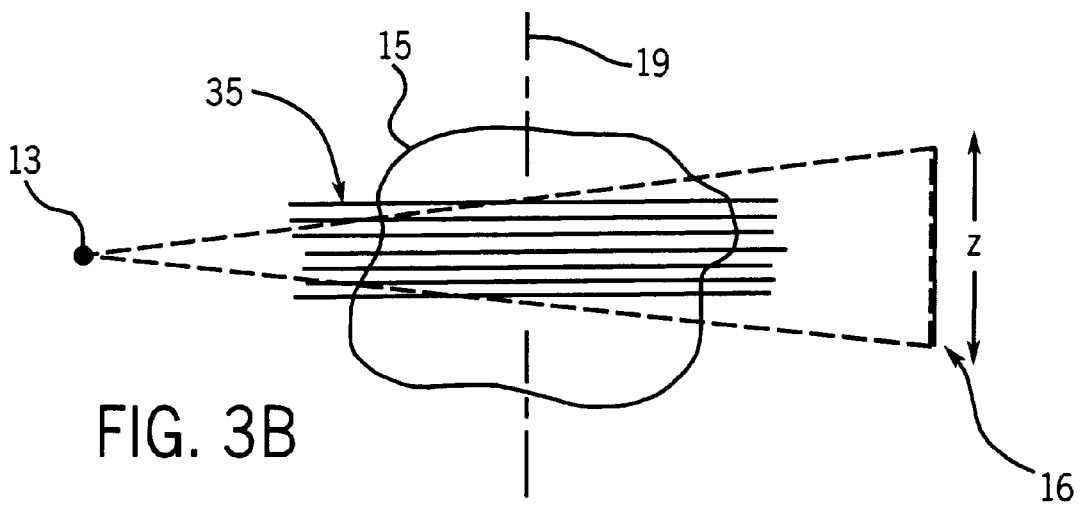

As shown best in FIG. 3a, in the preferred embodiment of the present invention the detector array 16 is a flat array of detector elements 18, having $N_r$ (e.g. 1000) elements 18 disposed along the in-plane (x,y) direction, and N. (e.g. 16) elements 18 disposed along the z axis. The x-ray beam emanates from the x-ray source 13 and fans out as it passes through the patient 15 and intercepts the detection array 16. Each acquired view is a $N_r$ by $N_z$ array of attenuation measurements as seen when the gantry is oriented in one of its positions during the scan. As shown in FIG. 3B, the object of the present invention is to reconstruct as set of 2D image slices 35 from the 3D array of acquired data produced by the x-ray cone beam during the scan. It can be seen that because the cone beam diverges as it passes through the patient 15, the reconstruction of the parallel image slices 35 is not possible with a straight forward fan beam filtering and backprojection process. The present invention enables an accurate reconstruction of the image slices 35 from this acquired cone beam data.

Figure 4A:
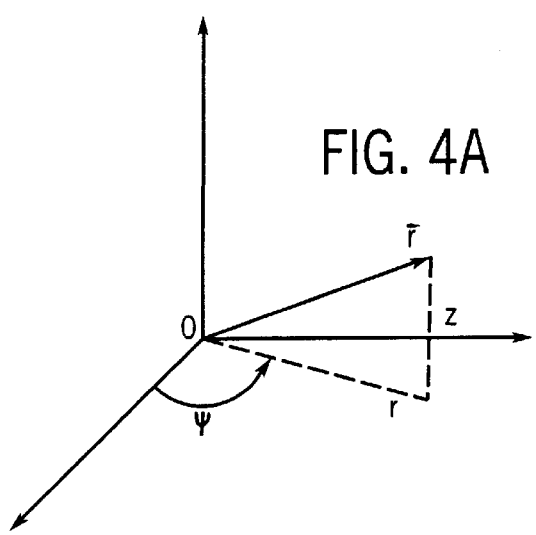
FIGS. 4a–4c are vector diagrams used to explain the image reconstructor which forms part of the CT imaging system.

Referring particularly to FIG. 4a, let $f(\vec{r})$ be the function of the image to be reconstructed, where $\vec{r}$ is the position vector. In a cylindrical coordinate system one has $$\vec{r} = (r\cos\phi, r\sin\phi, z) \qquad (1)$$

Figure 4B:
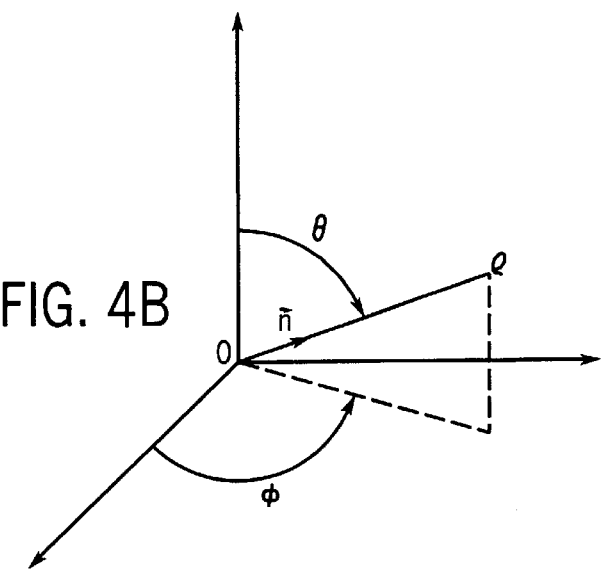
Figure 4C:
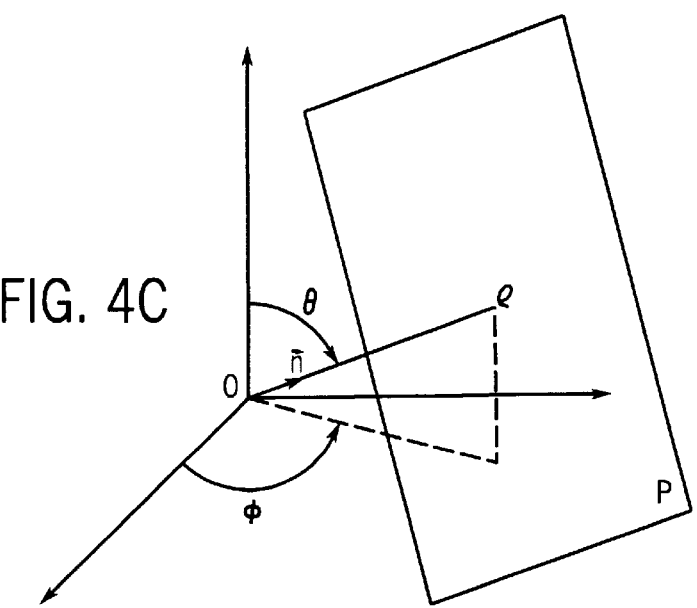

Let $Rf(\varrho, \vec{n})$ be the Radon transform of $f(\vec{r})$. As shown in FIG. 4b, each point in the Radon space is characterized by its algebraic distance, $\varrho$, to the origin O and the unit vector, $\vec{n}$, which is along the line connecting the origin O to the point. In the object space, $(\varrho, \vec{n})$ defines a plane P with its normal of $\vec{n}$ and its algebraic distance to the origin of $\varrho$, as shown in FIG. 4c. As shown in FIG. 4b, $\vec{n}$ can be further characterized by the co-latitude angle, $\theta$, and the longitude angle, $\phi$, as follows:

$$\vec{n} = (\sin\theta\cos\phi, \sin\theta\sin\phi, \cos\theta) \qquad (2)$$

Note that $(\varrho,\theta,\phi)$ supports the entire Radon space and the entire Radon space may be denoted by S. By definition, Radon transform $Rf(\varrho, \vec{n})$, contains the value of integration of $f(\vec{r})$ over the plane that is characterized by $(\varrho, \vec{n})$. This relation can be mathematically expressed as follows:

$$Rf(\varrho, \vec{n}) = \int f(\vec{r})\delta(\vec{r}\cdot\vec{n} - \varrho)d\vec{r} \qquad (3)$$

The inverse formula of the 3D Radon transform is given as follows:

$$f(\vec{r}) = -\frac{1}{8\pi^2}\int_{Q^2}\frac{\partial R^2 f}{\partial \varrho^2}(\vec{r}\cdot\vec{n},\vec{n})d\vec{n} \qquad (4)$$

where the integration is over a half unit sphere in Radon space. This can be rewritten as follows:

$$f(\vec{r}) = -\frac{1}{8\pi^2}\int S\int\frac{\partial R^2 f}{\partial \varrho^2}(\varrho,\vec{n})\delta(\vec{r}\cdot\vec{n}-\varrho)d\varrho d\vec{n} \qquad (5)$$

$$= \frac{1}{8\pi^2}\int_{\phi=0}^{2\pi}\int_{\theta=0}^{\pi}\int_{\varrho=-\infty}^{\infty}\frac{\partial R^2 f}{\partial \varrho^2}(\varrho,\vec{n})\delta(\vec{r}\cdot\vec{n}-\varrho)|\sin\theta|d\varrho d\theta d\phi$$

where the integration is over the entire Radon space S.

The Radon space S can be divided into two subspaces, subspace D which is supported by projection data, and subspace C that is not supported by projection data.

$$f(\vec{r}) = f_D(\vec{r}) + f_c(\vec{r}) \qquad (6)$$

where:

$$f_D(\vec{r}) = -\frac{1}{8\pi^2}\int D\int\frac{\partial R^2 f}{\partial \varrho^2}(\varrho,\vec{n})\delta(\vec{r}\cdot\vec{n}-\varrho)d\varrho d\vec{n} \qquad (7)$$

and $$f_c(\vec{r}) = -\frac{1}{8\pi^2}\int C\int\frac{\partial R^2 f}{\partial \varrho^2}(\varrho,\vec{n})\delta(\vec{r}\cdot\vec{n}-\varrho)d\varrho d\vec{n} \qquad (8)$$

Points in subspace C usually have small co-latitude angle, $\theta$. Since the contribution from each point of Radon space is weighted by $\sin\theta$, points in subspace C tend to have small weighting. As a result, it is safe to conclude that $f_c(\vec{r})$ need not be calculated with high precision in order to reconstruct accurate slice images. On the other hand, since $f(\vec{r})$ is primarily determined by $f_D(\vec{r})$, an accurate reconstruction of $f_D(\vec{r})$ is crucial.

To accurately reconstruct $f_D(\vec{r})$ we transform equation (7) from $(\varrho,\theta,\phi)$ to the detector coordinates system $(1,\Theta,\vec{OS})$. By doing so, the intermediate calculation of $$\frac{\partial Rf}{\partial \varrho}$$

as taught by Grangeat can be eliminated and $f_D(\vec{r})$ can be reconstructed directly from the projection data. In making this transformation, the following relation, derived from the Central Slice Theorem, is used:

$$\Sigma_{\overrightarrow{OS}}(1\Theta) = \int FP_{\overrightarrow{OS}}(\omega,\Theta)\varrho^{j2\pi\omega 1}d\omega \qquad (9)$$

where $FP_{\overrightarrow{OS}}(\omega,\Theta)$ is the 2D Fourier transform of $P_{\overrightarrow{OS}}(Y,Z)$, expressed in the polar coordinate system. From equation (9)

one has:

$$\frac{\partial \sum_{o\vec{s}}(l, \Theta)}{\partial l} = \int FP_{o\vec{s}}(\omega, \Theta) j2\pi\omega e^{j2\pi\omega l} d\omega \quad (10)$$

The specific form of the transformation is determined by the particular machine geometry, and for the circular scanning geometry of the preferred embodiment, the image $f_D(\vec{r})$ can be calculated as follows:

$$f_D(\vec{r}) = \qquad (11)$$

$$\frac{1}{2}\oint \frac{d\Phi d^2}{(d-\vec{r}\cdot\vec{s})^2}\int\int FP_{o\vec{s}}(\omega, \Theta)\omega^2 \sin\Theta e^{j2\pi(Y_0\sin\Theta+Z_0\cos\Theta)\omega}$$

$$d\omega d\Theta + R\left(\frac{1}{d^0}\right)$$

where:

$$Y_0 = \frac{d\vec{r}\cdot\hat{u}}{d-\vec{r}\cdot\hat{s}}$$

$$Z_0 = \frac{dz}{d-\vec{r}\cdot\hat{s}}$$

The first term in equation (11) is precisely the filtering and back projection method described by Feldkamp et al in the above-cited article which is incorporated herein by reference. The second term $R(l/d^0)$ may be ignored without significantly affecting image quality, however, if higher accuracy is required it may be calculated as well. In other words, the most important calculation $f_D(\vec{r})$ in the cone beam image reconstruction can be accurately and efficiently performed using the Feldkamp et al method.

The remaining term $f_c(\vec{r})$ in the final image $f(\vec{r})$ may be calculated using the methodology disclosed in the above-cited Grangeat publication which is incorporated herein by reference. More specifically, $$\frac{\partial Rf}{\partial \varrho}$$

on the boundary of subspace D is calculated from the cone beam projection data using the following equation disclosed by Grangeat that relates the derivative of cone beam plane integral to the derivative of parallel beam plane integral:

$$\frac{\partial Rf}{\partial \varrho}(\vec{OS}\cdot\vec{n}, \vec{n}) = \frac{|\vec{OS}|^2}{|\vec{OS}\times\vec{n}|^2}\frac{\partial \sum_{o\vec{s}}(l, \Theta)}{\partial l} \quad (12)$$

where, the line denoted by $(1,\Theta)$ is the intersection of the plane P characterized by $(\varrho=\vec{OS}\cdot\vec{n}, \vec{n})$ and the detector plane denoted by $\vec{OS}$. Next, $$\frac{\partial Rf}{\partial \varrho}$$

is estimated in subspace C. Note that since subspace C is not supported by cone beam projection data, we assume that $$\frac{\partial Rf}{\partial \varrho}$$

is continuous at the boundary of subspace D and C, and interpolate therebetween. Having calculated these values, $f_c(\vec{n})$ is calculated using the above equation (8) and this reconstructed image data is added to that produced from equation (11) to yield the final image slices.

Figure 5:
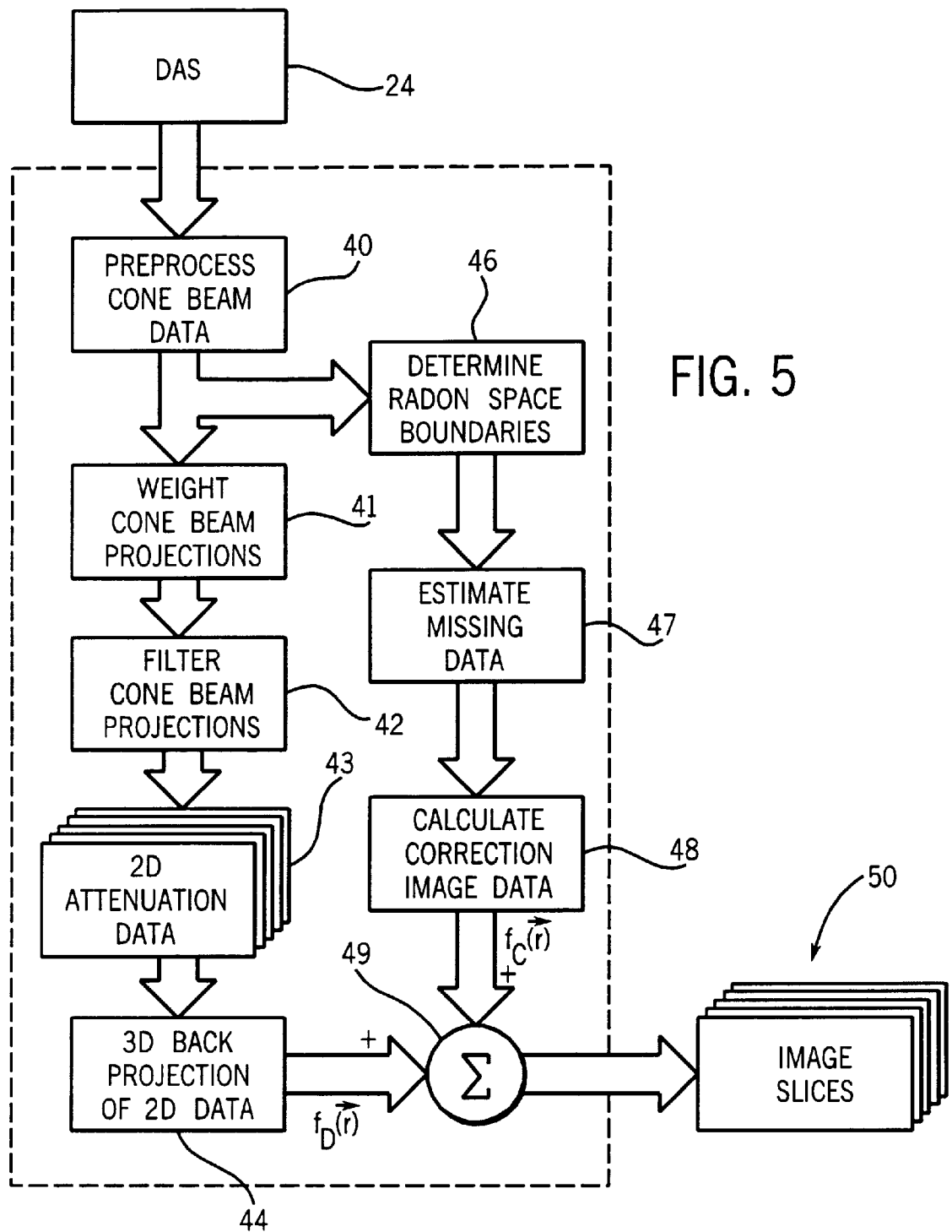
FIG. 5 is a block diagram of the image reconstructor which forms part of the CT imaging system of FIG. 2.

This reconstruction method is implemented in the image reconstructor 25. Referring particularly to FIG. 5, the cone beam projection data is received from the DAS 24 as a two-dimensional array of values which are preprocessed in the standard manner at process block 40. Such preprocessing includes correcting for known errors and offsets and calculating the minus log of the data to convert it to x-ray attenuation values.

The preprocessed cone beam attenuation profiles are used to separately calculate the two image terms $f_D(\vec{r})$ and $f_c(\vec{r})$. The main image term $f_D(\vec{r})$ is calculated in a sequence of steps indicated by process blocks 41–44 which is essentially the method described by Feldkamp et al. It includes multiplying the cone beam projection data by weighting factors, as indicated at process block 41:

$$P'_\phi(Y,Z) = P_\phi(Y,Z) d\sqrt{d^2+y^2+Z^2} \quad (13)$$

where d=distance from x-ray source to detector element.

The resulting projection data is then filtered by convolving it with a filter kernal as indicated at process block 42.

$$\overline{P_\phi}(Y, Z) = \int_{-\infty}^{\infty} dY' \int_{-\infty}^{\infty} dZ' g_y(Y-Y') g_z(Z-Z') P'_\phi(Y', Z') \quad (14)$$

where the kernals are:

$$g_y(Y) = Re\int_0^{\omega_{yo}} \omega d\omega e^{i\omega y}$$

$$g_z(Z) = \sin\omega_{z0} Z / \pi Z$$

The filtered attenuation data is then back projected from each detector element position back along the ray extending from the point source of the x-ray cone beam. This results in a 3D image array $f_D(\vec{r})$.

$$f_D(\vec{r}) = \frac{1}{4\pi^2}\oint d\phi \frac{d^2}{(d+r\cdot\hat{x}')^2}\overline{P_\phi}[Y(\vec{r}), Z(\vec{r})] \quad (15)$$

where $Y(\vec{r}) = \vec{r}\cdot\hat{y}' d/(d+\vec{r}\cdot\hat{x}')$ $Z(\vec{r}) = \vec{r}\cdot\hat{z} d/(d+\vec{r}\cdot\hat{x}')$ As is well known in the art, the image reconstructed in this manner through the midplane of the cone beam is very accurate. However, as the images move away from this midplane image, their quality decreases due to incomplete data. Corrections for this deterioration in image quality is provided by the $f_c(\vec{r})$ image term described above and calculated as will now be described.

Referring still to FIG. 5, the acquired and preprocessed cone beam attenuation data is also applied to a process block 46 in which the boundaries between the C and D subspaces are calculated as set forth above in equation (12). As indicated at process block 47, the data values in subspace C are then calculated by interpolating between values at the boundaries with subspace D, and these estimated values are applied to process block 48 which calculates the correction images $f_c(\vec{r})$ using the above equation (8). The corresponding slices $f_D(\vec{r})$ and $f_c(\vec{r})$ are added together at summing point 49 to produce the final image slices 50 for the computer 26.

What is claimed is:

1. A computed tomography imaging system which comprises:

a two-dimensional array of detector elements for receiving photons emanating in a cone beam from a source;

a digital acquisition system for acquiring two-dimensional arrays of cone beam data from the array of detector elements at a series of views in which the array of detector elements revolves around a central axis;

a filter for receiving the cone beam data and filtering the same;

means for back projecting the filtered cone beam data to produce image data $f_D(\vec{r})$;

means for receiving the cone beam data and producing from the received cone beam data estimated cone beam values not provided by the received cone beam data;

means for receiving the estimated cone beam values and calculating from the estimated cone beam values corrected image data $f_C(\vec{r})$; and summing means for combining the image data $f_D(\vec{r})$ with the corrected image data $f_C(\vec{r})$ to produce an image slice.

2. The system as recited in claim 1 in which the means for estimating cone beam values includes means for determining the boundaries in Radon space between regions therein for which complete cone beam data is received and regions therein for which cone beam data is incomplete, and means for interpolating between complete cone beam data at the Radon space boundaries to provide said estimated values.

3. The system as recited in claim 1 which includes means for weighting the cone beam data, based on the distance from the source to the detector elements, prior to its application to the filter.

4. The system as recited in claim 1 in which the source produces x-rays and is located on the side opposite the array of detector elements from the central axis, and both the array of detector elements and x-ray source are revolved around the central axis during the acquisition of said series of views.

5. The system as recited in claim 4 in which the acquired cone beam data is preprocessed to provide x-ray attenuation data for a three-dimensional region about the central axis and between the x-ray source and the array of detector elements, and the image data $f_D(\vec{r})$ and correction image data $f_C(\vec{r})$ are summed to produce a plurality of two-dimensional image slices through said three-dimensional region.

6. A method for producing an image with a computed tomography imaging system having a two-dimensional array of detector elements, the steps comprising:

a) acquiring two-dimensional arrays of cone beam data from the array of detector elements at a series of views in which the array of detector elements revolves around a central axis;

b) filtering the acquired cone beam data;

c) back projecting the filtered cone beam data to produce image data $f_D(\vec{r})$;

d) producing estimated cone beam values not provided by the acquired cone beam data, the estimated cone beam values being calculated from the acquired cone beam data;

e) calculating corrected image data $f_C(\vec{r})$ from the estimated cone beam values; and f) producing an image slice by combining the image data $f_D(\vec{r})$ with the corrected image data $f_C(\vec{r})$.

7. The method as recited in claim 6 in which step d) includes:

i) determining boundaries in Radon space between regions therein for which complete cone beam data was acquired and regions therein for which cone beam data was not acquired; and ii) interpolating between complete cone beam data at the Radon space boundaries to produce said estimated cone beam values.

8. The method as recited in claim 6 which includes:

weighting the acquired cone beam data prior to filtering in step b).

9. The method as recited in claim 6 which includes:

preprocessing the acquired cone beam data to produce x-ray attenuation data for a three-dimensional region about the central axis; and producing a plurality of two-dimensional image slices through said three-dimensional region in step f).

* * * * *